(No Model.)

H. MORRISON.
BICYCLE BRAKE.

No. 596,526. Patented Jan. 4, 1898.

Witnesses
Benjamin Clark.
C. H. Hawkins.

Inventor.
Harry Morrison
per E. Eaton
His attorney

UNITED STATES PATENT OFFICE.

HARRY MORRISON, OF LONDON, ENGLAND.

BICYCLE-BRAKE.

SPECIFICATION forming part of Letters Patent No. 596,526, dated January 4, 1898.

Application filed October 26, 1896. Serial No. 610,119. (No model.)

*To all whom it may concern:*

Be it known that I, HARRY MORRISON, a subject of the Queen of Great Britain, and a resident of Stratford, London, in the county of Essex, England, have invented certain new and useful Improvements in Brakes, of which the following is a full, clear, and exact specification.

This invention consists in improvements in brakes, the object being to provide a brake which may be gradually applied to the tire or wheel without injury to same; and it consists, essentially, of a roller which when in contact with the tire or wheel will rotate, but when caused to bear with increased pressure the rotation of the roller is retarded accordingly, and so acts as a brake upon the tire or wheel.

In order that my invention may be fully understood, I will now refer to the annexed drawings, in which—

Figure 1:
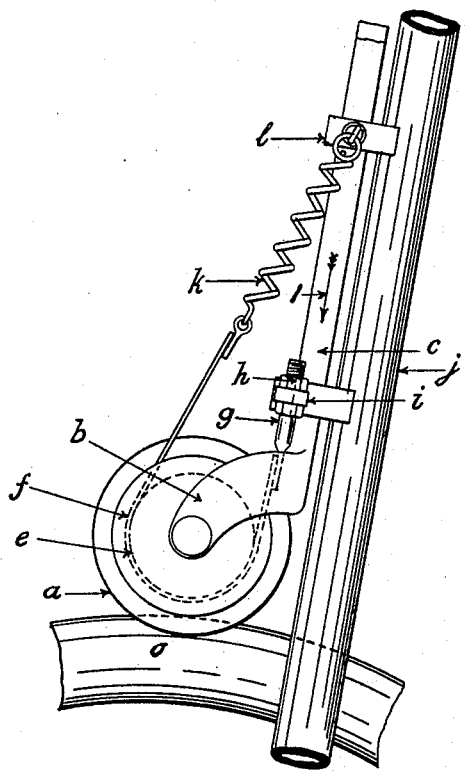
Figure 2:
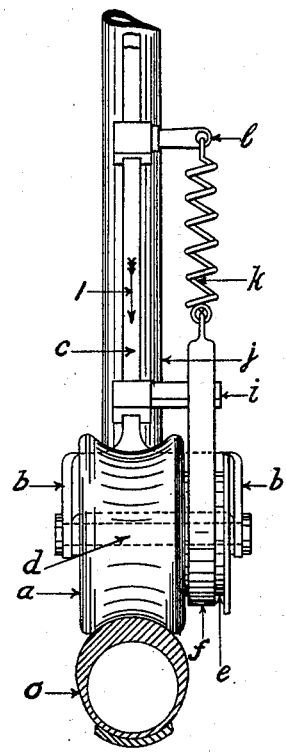

Figure 1 is a side elevation showing my invention; Fig. 2, end view of same.

Referring to Figs. 1 and 2, $a$ is a roller, which may be of any suitable material and which is supported in the forked or bifurcated ends $b$ of the brake-rod $c$ by means of the spindle $d$.

$e$ is a drum or pulley, which may be formed integral with or attached to the roller $a$.

$f$ is a band or strap, of suitable material, which passes partially round the drum or pulley $e$, one end being attached to the screwed rod $g$, which is adjustably secured by means of the nuts $h$ in the bracket or lugs $i$, and which in the case of a bicycle is attached to the head $j$ of the machine. The other end of the band or strap $f$ is attached to the spring $k$, which is secured to the bracket $l$, which is also attached to the head $j$ of the machine. The brake-rod $c$ slides in the sockets $m$ and $n$, which carry the brackets or lugs $i$ and $l$.

$o$ is the tire of the bicycle-wheel.

It will be seen that by moving the brake-rod $c$ in the direction of the arrow 1 the roller $a$ upon coming into contact with the tire $o$ will rotate upon the spindle $d$, and upon farther moving the brake-rod $c$ in the direction of the arrow 1 the band or strap $f$ will bear upon the wheel or pulley $e$ and retard its rotation according to the amount of extension of the spring $k$, thus acting as a brake upon the tire or wheel $o$, the tension of the spring $k$ being adjusted or regulated by the nuts $h$.

Having thus described my invention, what I claim, and desire to secure by Letters Patent, is—

In brakes of the class herein described, in combination a band or strap passing partially round a wheel or drum attached to the brake-roller; a spring secured to one end of said band or strap; a sliding brake-rod to which the other end of said spring is secured; bearings upon said brake-rod which carries the brake-roller; an adjustable screw-bolt to which the other end of said band is secured for the purpose of enabling the tension of the band or strap to be regulated when required; sockets or guides secured to the machine and in which said brake-rod slides.

In testimony that I claim the foregoing I have hereunto set my hand this 23d day of September, 1896.

H. MORRISON.

Witnesses:
 BENJAMIN CLARK,
 S. CRANSAS.